Oct. 2, 1928. J. S. JOHNSTON Re. 17,096

METHOD OF COLORING YARN ON BOBBINS

Original Filed Nov. 20, 1924

WITNESS
H. Wurst

INVENTOR
J. S. Johnston
BY
Denson & Thompson
ATTORNEYS

Reissued Oct. 2, 1928. Re. 17,096

UNITED STATES PATENT OFFICE.

JAMES S. JOHNSTON, OF ELMIRA, NEW YORK, ASSIGNOR, BY MESNE ASSIGNMENTS, TO ECLIPSE TEXTILE DEVICES, INCORPORATED, OF ELMIRA HEIGHTS, NEW YORK, A CORPORATION OF NEW YORK.

METHOD OF COLORING YARN ON BOBBINS.

Original No. 1,613,707, dated January 11, 1927, Serial No. 751,069, filed November 20, 1924. Application for reissue filed March 8, 1928. Serial No. 280,214.

This invention relates to a method of coloring yarn on the bobbin the object being to produce a uniform coloring of a portion of the yarn from the periphery to the core, leaving the remaining portions uncolored.

One of the specific objects is to provide a more expeditious method of carrying out the preceding object than has heretofore been practiced.

Other objects and uses will be brought out in the following descriptions.

In the drawings:—

Figure 1:
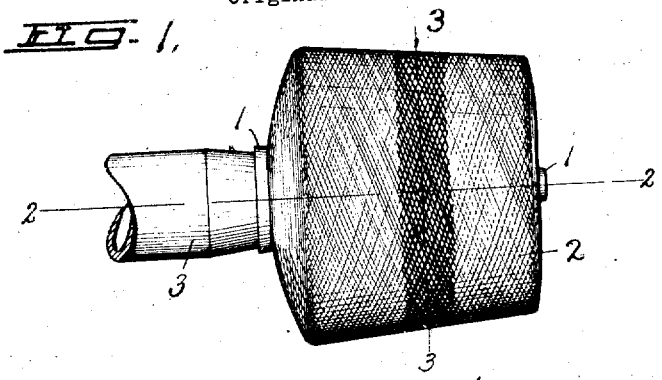
Figure 1 is a face view of a bobbin of yarn showing the colored portion thereof by a circumferentially extending band of relatively dark lines.

In carrying out this process a perforated core 1 carrying a mass of yarn 2 wound thereon is placed over and upon a suction nozzle 3 which may be connected to any suitable suction producing device not necessary to herein illustrate or describe. This nozzle is preferably tapered and is provided with radial perforations 4 through the walls thereof and adapted to register with similar perforations 5 in the walls of the hollow core 1 when the latter with the yarn wound thereon is placed on the suction nozzle.

A delivery nozzle 6 for the coloring liquid may be connected to any source of supply preferably in such manner as to enable the liquid to flow by gravity to the nozzle, the mouth of which is arranged in close proximity to the periphery of the mass of yarn 2.

The nozzle 3 forms a part of a mandrel which is adapted to be rotated by any suitable means to effect a corresponding rotary movement of the core 1 with the bobbin thereon when the core is frictionally engaged with the tapered nozzle.

For example, when the core 1 with the yarn wound thereon is placed upon the suction nozzle 3 and rotated thereby, the coloring fluid is allowed to flow into the nozzle 6 and against a portion of the periphery of the yarn 2 and at the same time suction is produced in the nozzle 3 to draw the coloring fluid from the mouth of its nozzle through the interposed portion of the yarn as the bobbin with the yarn thereon is rotated relatively to the delivery nozzle 6.

Figure 2:
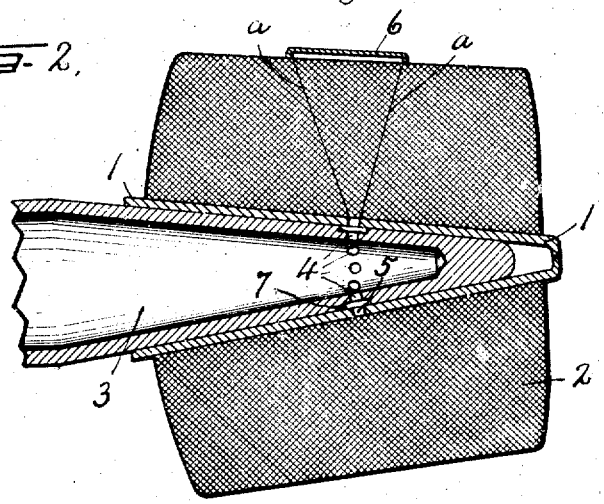
Figure 2 is an enlarged longitudinal sectional view of the bobbin and portions of the apparatus used in carrying out the coloring process.
Figure 3:
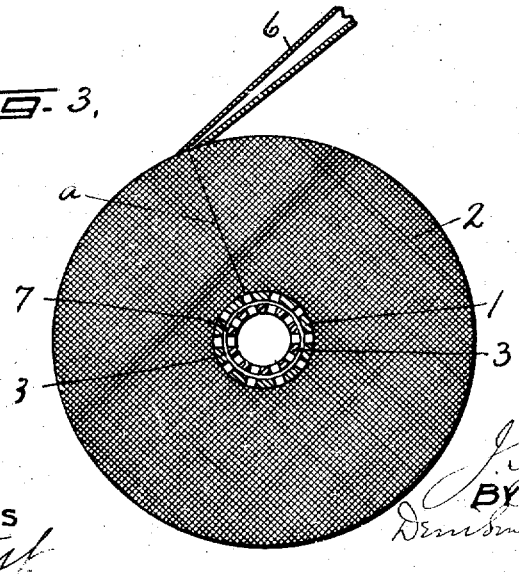
Figure 3 is a transverse sectional view through the bobbin, core and suction nozzle showing also the delivery nozzle for the coloring matter.

This rotation causes a distribution of the coloring fluid circumferentially around the periphery of the yarn during which rotation the suction through the porous yarn causes the coloring fluid to be drawn along direct lines *a*, Figures 2 and 3, between the mouth of the delivery nozzle 6 and apertures in the suction nozzle.

The portion of the suction nozzle adjacent the apertures in the core 1 is provided with a peripheral groove 7 of sufficient length to assure its registration with the apertures 5 when the core with the yarn wound thereon is placed upon the nozzle, the object of the annular groove 7 being to assure communication between the apertures in the nozzle and those in the core in case the apertures of one of those parts should not register with those of the other part, thereby maintaining communication between the interior of the suction nozzle and delivery end of the supply nozzle 6 for the coloring matter through the porous yarn.

The face width of the delivery nozzle 6 is, of course, considerably less than the length of the bobbin to assure the coloring of a portion only of the yarn along the lines of suction between the apertures 4 and nozzle 6, leaving the remaining portions of the yarn uncolored.

This method of coloring portions of the yarn is found in actual practice to be very expeditious and economical by reason of the fact that the yarn is colored in mass or on the bobbin without unwinding it therefrom, thereby producing a more even distribution of the coloring liquid in the colored portions of the yarn so that when it is knitted into fabric the colored portions blend with the uncolored portions and impart the desired cloudy or mottled appearance.

For further description of the details of the construction of the apparatus, reference may be had to pending application Serial No. 751,070 filed November 20, 1924.

What I claim is:—

1. The herein described process for coloring portions of yarn on the bobbin consisting in applying a coloring fluid to a portion of the periphery of the yarn on the bobbin and drawing said coloring matter into the yarn by suction applied to the interior of the bobbin.

2. The herein described method of coloring yarn on the bobbin consisting in providing the yarn with a perforated core, applying suction to the interior of the core and simultaneously applying the coloring fluid to a portion of the periphery of the yarn on the core.

3. Random coloring a hollow mass of yarn having inner and outer surfaces comprising continuously rotating the mass about its axis, creating a current of air through a limited portion of the mass from one surface to the other and introducing coloring fluid into the current of air as it passes through the mass.

4. The herein described method of coloring a hollow mass of yarn having inner and outer surfaces consisting in applying suction to a portion of one of said surfaces and simultaneously applying the coloring matter to a portion of the other surface and simultaneously rotating said mass.

5. The herein described method of coloring a mass of yarn consisting in applying nozzles to the interior and to the exterior of the mass of yarn, producing suction in one of the nozzles, and supplying coloring matter through the other nozzle.

6. The herein described method of coloring a mass of yarn consisting in applying nozzles to the interior and to the exterior of the mass of yarn, producing suction in one of the nozzles and supplying coloring matter through the other nozzle and rotating the yarn relatively to one of the nozzles.

7. The method of spotting yarn which comprises passing an unlimited quantity of dyeing liquid into, through and out of a limited part of a wound mass of yarn with such rapidity that no material part of the liquid soaks into the adjacent parts of the mass.

8. Random coloring a hollow mass of yarn having inner and outer surfaces, comprising creating a current of air through the mass from one of said surfaces to the other, and introducing coloring fluid into the air current by applying it to a limited portion of the surface of the mass from which said current is entering the mass.

9. A method of random dyeing yarn in the mass, which comprises creating an air current through the mass between opposite surfaces thereof, and introducing a coloring fluid into said air current by applying it to a limited area of the surface of the mass through which said air current is entering the mass, so that the coloring fluid is drawn by the air current through a limited portion of the mass.

10. The method of spotting yarn, which comprises passing an unlimited quantity of dyeing liquid into, through and out of a limited part of a wound mass of yarn between opposite faces thereof with such rapidity that no material part of the liquid soaks into the adjacent parts of the mass.

11. The method of spotting yarn, which comprises passing an unlimited quantity of dyeing liquid into, through and out of a limited part of a hollow wound mass of yarn between opposite inner and outer faces thereof with such rapidity that no material part of the liquid soaks into the adjacent parts of the mass.

In testimony whereof I have hereunto set my hand.

JAMES S. JOHNSTON.